United States Patent
Li et al.

(10) Patent No.: US 12,296,931 B2
(45) Date of Patent: May 13, 2025

(54) BIONIC CUTTLEFISH-TYPED UNDERWATER DETECTION ROBOT

(71) Applicant: Shijiazhuang Tiedao University, Shijiazhuang (CN)

(72) Inventors: Baoqi Li, Shijiazhuang (CN); Yuzhu Jiang, Shijiazhuang (CN); Xianshun Guo, Shijiazhuang (CN); Fei Han, Shijiazhuang (CN); Haiqing Zheng, Shijiazhuang (CN); Tonghao Zhang, Shijiazhuang (CN); Fu Shi, Shijiazhuang (CN); Pengyu Zhu, Shijiazhuang (CN); Jiahui Tang, Shijiazhuang (CN); Angyue Lv, Shijiazhuang (CN)

( * ) Notice: Subject to any disclaimer, the term of this patent is extended or adjusted under 35 U.S.C. 154(b) by 0 days.

(21) Appl. No.: 18/954,514

(22) Filed: Nov. 20, 2024

(65) Prior Publication Data

US 2025/0074563 A1 Mar. 6, 2025

(30) Foreign Application Priority Data

Jun. 18, 2024 (CN) .......................... 202410780906.3

(51) Int. Cl.
*B63G 8/00* (2006.01)
*B63C 11/52* (2006.01)
(Continued)

(52) U.S. Cl.
CPC .............. *B63G 8/001* (2013.01); *B63C 11/52* (2013.01); *B63G 8/08* (2013.01); *G05D 1/656* (2024.01);
(Continued)

(58) Field of Classification Search
CPC . B63G 8/00; B63G 8/001; B63G 8/08; G05D 1/656; B63C 11/00; B63C 11/52;
(Continued)

(56) References Cited

FOREIGN PATENT DOCUMENTS

| CN | 102700694 A | * | 10/2012 | ............... B63G 8/08 |
|----|-------------|---|---------|---------------------------|
| CN | 108622347 A | * | 10/2018 | ............... B63G 8/08 |
| CN | 114537619 A | * | 5/2022  |                           |

* cited by examiner

*Primary Examiner* — Lars A Olson
(74) *Attorney, Agent, or Firm* — Addison D. Ault; IPGentleman Intellectual Property Services, LLC

(57) ABSTRACT

The present disclosure discloses a bionic cuttlefish-typed underwater detection robot, including a bionic "cuttlefish"-typed body structure, a piezoelectric energy capture device, a circuit rectification and storage assembly and a power control assembly. The bionic "cuttlefish"-typed body structure includes a head and a main body; the piezoelectric energy capture device includes piezoelectric ceramic elements arranged around the main body and PVDF floating belts, and an end of each piezoelectric ceramic element is connected to a spherical spoiler component, the PVDF floating belts are evenly distributed at a tail end of the main body. The present disclosure adopts piezoelectric ceramic elements with spoiler components and PVDF floating belts to generate electricity, converts wave energy and ocean current energy into electric energy, powers the power control assembly of the detection robot. It has high power generation efficiency and stable current, and realizes the autonomous operation of the underwater detection robot.

10 Claims, 5 Drawing Sheets

(51) Int. Cl.
| | |
|---|---|
| *B63G 8/08* | (2006.01) |
| *G05D 1/656* | (2024.01) |
| *H02J 7/02* | (2016.01) |
| *H02J 7/32* | (2006.01) |
| *H02N 2/18* | (2006.01) |
| *G05D 105/80* | (2024.01) |
| *G05D 107/00* | (2024.01) |
| *G05D 109/30* | (2024.01) |

(52) U.S. Cl.
CPC ............... *H02J 7/02* (2013.01); *H02J 7/32* (2013.01); *H02N 2/185* (2013.01); *H02N 2/186* (2013.01); *B63G 2008/002* (2013.01); *G05D 2105/87* (2024.01); *G05D 2107/27* (2024.01); *G05D 2109/38* (2024.01)

(58) Field of Classification Search
CPC ...... H02J 7/00; H02J 7/02; H02J 7/32; H02N 2/18; H02N 2/185; H02N 2/186
USPC ........................................................ 114/337
See application file for complete search history.

BIONIC CUTTLEFISH-TYPED UNDERWATER DETECTION ROBOT

CROSS-REFERENCE TO RELATED APPLICATION

This application claims priority to Chinese Patent Application No. 202410780906.3, filed on Jun. 18, 2024 before the China National Intellectual Property Administration, the disclosure of which is incorporated herein by reference in entirety.

TECHNICAL FIELD

The present disclosure relates to the field of underwater bionic robots, and in particular to a bionic cuttlefish-typed underwater detection robot.

BACKGROUND

Underwater detectors generally work in deep water layer, and they are used to explore unknown marine environments and realize the detection and collection of various marine information. In recent years, the detectors have been developed in the trend of low energy consumption, small size and bionic appearance. For example, new integrated sensors are designed to reduce energy consumption, imitate the special structure of seal whiskers to increase the detection distance, and wireless power transmission technology or photovoltaic power generation technology is applied. However, the existing detectors generally have the following problems: I. The detector has a strange appearance, and thereby it is easily rejected and attacked by seabed organisms; it also does not meet the mechanical requirements of underwater travel, and has large travel resistance and high energy consumption; II. Underwater detectors often use batteries, including lithium batteries, nickel-hydrogen batteries, lithium-ion batteries, etc., as the main energy source. However, this energy supply method not only has the disadvantages of heavy battery and large volume, which limit the maneuverability and operational flexibility of the detector, but also requires regular long-term charging or replacement of batteries, which limits the execution time of the detector's task and leads to low task execution efficiency.

In recent years, some power generation devices that utilize ocean energy and kinetic energy have been disclosed at home and abroad to meet the requirements of energy supply of underwater detectors. Patent literature CN111355403A discloses a jellyfish-shaped piezoelectricity and triboelectricity-composited marine mechanical energy collector, which uses a hemispherical friction energy capture device and a strip-shaped flexible piezoelectric material to form a hybrid power generation device to provide energy supply for the collector. CN116946335A is a parasol-wing self-sustaining underwater vehicle with two modes: movement and power generation. However, its folding and unfolding power generation mechanism is complex in structure and it cannot generate electricity efficiently underwater. CN113060262A provides a marine robot with flapping wing power generation and drive. The robot can only provide energy for the vehicle through wave energy generation, and therefore the energy supply method is instable/single, and the wave energy conversion efficiency of its flapping wings is low, and additionally, power generation is easily affected by large wind and waves.

It can be seen that in the prior art, underwater detection robots have the problems of single energy supply method, relatively low power generation efficiency, and inability to achieve autonomous operation.

SUMMARY

The objective of the present disclosure is to provide a bionic cuttlefish-typed underwater detection robot to solve the problems of the single energy supply method and relatively low power generation efficiency of underwater detection robots in the prior art.

In order to achieve the above objective, the present disclosure proposes a bionic cuttlefish-typed underwater detection robot, comprising a bionic "cuttlefish"-typed body structure, and a piezoelectric energy capture device, a circuit rectification and storage assembly and a power control assembly arranged on the bionic "cuttlefish"-typed body structure, wherein the bionic "cuttlefish"-typed body structure comprises a head and a main body; wherein the piezoelectric energy capture device comprises multiple groups of piezoelectric ceramic elements and multiple PVDF floating belts with thin films attached thereon, and the multiple groups of piezoelectric ceramic elements are arranged around the main body in a cross cantilever beam axisymmetric structure, and an end of each piezoelectric ceramic element is connected to a spherical spoiler component, the multiple PVDF floating belts are evenly distributed at a tail end of the main body;

wherein the circuit rectification and storage assembly and the power control assembly are both installed inside the main body, the circuit rectification and storage assembly is electrically connected to the multiple groups of piezoelectric ceramic elements and the multiple PVDF floating belts, for converting electric energy obtained by the piezoelectric energy capture device into stable direct current electric energy and storing it; the power control assembly is electrically connected to the circuit rectification and storage assembly, for implementing power control of the underwater detection robot through the electric energy provided by the circuit rectification and storage assembly.

According to some embodiments of the present disclosure, 4-5 groups of piezoelectric ceramic elements are evenly distributed around the main body, and each group of piezoelectric ceramic elements comprises 5-6 piezoelectric ceramic elements arranged in an axial direction at intervals. Each piezoelectric ceramic element comprises a longitudinal piezoelectric ceramic sheet and a flexible protective shell covering the longitudinal piezoelectric ceramic sheet; wherein the longitudinal piezoelectric ceramic sheet has a size of 0.18 m×0.06 m×0.012 m. When the underwater detection robot swims underwater and the ocean flows, the piezoelectric ceramic elements can accept various ocean energies with multiple degrees of freedom to generate electricity through deformation. Spherical spoiler components are installed at the front ends of the piezoelectric ceramic elements, it can increase the deformation space of the piezoelectric ceramic elements and increase the power generation. The number of the above-mentioned PVDF floating belts is 6-8, with a length of 0.4 m-0.5 m, and thin films are attached thereon. When water flows over the surfaces of the floating belts, the thin films vibrate and then generate electricity through deformation.

According to some embodiments of the present disclosure, the main body is of a double-layer cylindrical structure, comprising an inner layer cylinder and an outer layer cylinder, and the outer layer cylinder is provided with a plurality of insertion holes, and each of the piezoelectric ceramic elements is inserted through one insertion hole and fixedly connected to an outer wall of the inner layer cylinder.

According to some embodiments of the present disclosure, the power control assembly comprises a motion control chip arranged inside the inner layer cylinder of the main body and a tail propeller at a tail end of the main body, and the motion control chip is configured to control speed and direction of the tail propeller to change movement and steering of the underwater detection robot.

According to some embodiments of the present disclosure, the bionic cuttlefish-typed underwater detection robot further comprises an annular protection frame, wherein the annular protection frame comprises a first annular frame, a second annular frame and a plurality of metal connecting rods fixedly connected between the first annular frame and the second annular frame; wherein the tail propeller is installed at the tail end of the main body and located inside the first annular frame; wherein the first annular frame has a diameter less than that of the second annular frame, and the first annular frame is fixedly connected to an end surface of the outer layer cylinder of the main body, and the annular protection frame is fixedly connected to the tail end of the main body through the first annular frame; wherein the multiple PVDF floating belts are evenly distributed on the second annular frame.

According to some embodiments of the present disclosure, each of the metal connecting rods is of a hollow structure, and the PVDF flexible floating belts are electrically connected to the circuit rectification and storage assembly through wires arranged in the metal connecting rods.

According to some embodiments of the present disclosure, the circuit rectification and storage assembly is arranged in the inner layer cylinder of the main body, and the circuit rectification and storage assembly comprises a rectifier circuit board, an energy collector and a battery; the energy collector is configured to collect electric energy generated by the piezoelectric ceramic elements and the PVDF floating belts, and convert the collected electric energy into direct current electric energy through the rectifier circuit board to charge the battery and store electric energy.

The bionic cuttlefish-typed underwater detection robot provided in this specification can achieve the following beneficial effects compared with the prior art:

The bionic cuttlefish-typed underwater detection robot provided in this specification adopts multiple groups of piezoelectric ceramic elements with spoiler components and multiple PVDF flexible floating belts to generate electricity, converts wave energy and ocean current energy into electric energy, and then powers the power control assembly of the detection robot. The piezoelectric ceramic elements with spoiler components adopted in the present disclosure has a large deformation space, high power generation efficiency, and stable current, and realizes the autonomous operation of the underwater detection robot.

BRIEF DESCRIPTION OF THE DRAWINGS

The drawings described herein are intended to provide a further understanding of the present disclosure and constitute a part of the present disclosure. The schematic embodiments of the present disclosure and their description are intended to explain the present disclosure, but do not constitute an improper limitation on the present disclosure. In the drawings.

Figure 1:
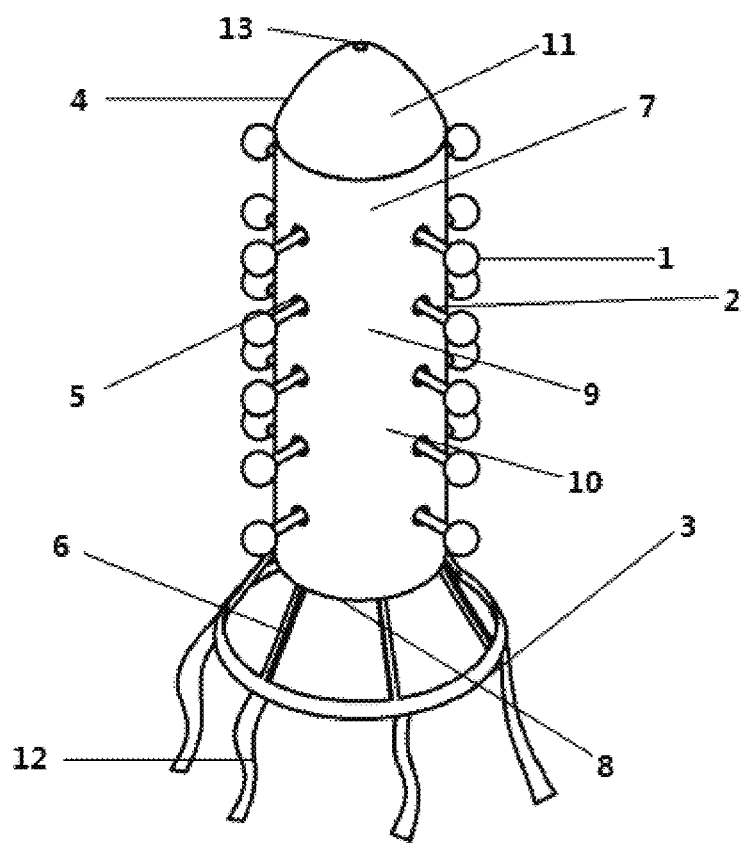
FIG. 1 is a schematic structural view of a bionic cuttlefish-typed underwater detection robot provided in this specification.
Figure 2:
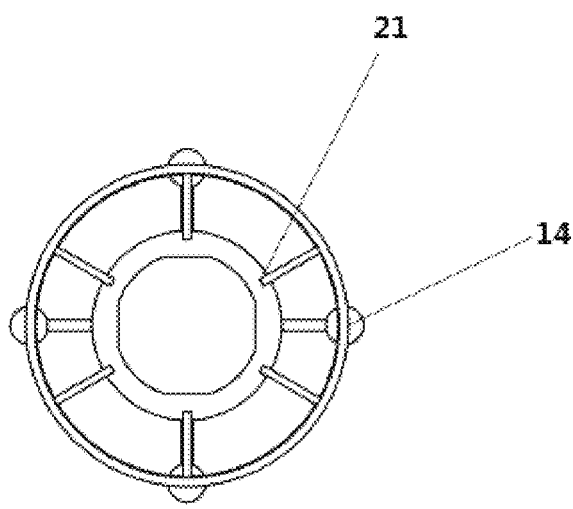
FIG. 2 is a schematic structural view of an annular protection frame of a bionic cuttlefish-typed underwater detection robot provided in this specification.

In the drawings: 1—spherical spoiler component, 2—piezoelectric ceramic element, 3—annular protection frame, 4—head, 5—insertion hole, 6—metal connecting rod, 7—main body, 8—propeller, 9—circuit rectification and storage assembly, 10—power control assembly, 11—detection assembly, 12—PVDF floating belt, 13—camera, 14—second annular frame, 15—inner-layer fixing port, 16—inner layer, 17—upper end surface, 18—lower end surface, 19—female buckle, 20—male buckle, 21—first annular frame.

DETAILED DESCRIPTION OF EMBODIMENTS

In order to make the purposes, technical solutions and advantages of the present disclosure clearer, the technical solutions of the present disclosure will be clearly and completely described in combination with the specific embodiments of the present disclosure and the corresponding drawings. Obviously, the described embodiments only represent part of the present disclosure, but not all of the present disclosure. Based on the embodiments in the specification, all other embodiments obtained by those skilled in the art without making creative work fall within the scope of protection of the present disclosure.

In the description of the present disclosure, it should be understood that the terms "central", "longitudinal", "lateral", "length", "width", "thickness", "up", "down", "front", "back", "left", "right", "vertical", "horizontal", "top", "bottom", "inside", "outside", "axial", "radial", "circumferential" and the like indicate the orientation or position relationship based on the orientation or position relationship shown in the drawings, they are only for the convenience of describing the technical solutions of the present disclosure and simplifying the description, rather than indicating or implying that the device or element referred to must have a specific orientation, be constructed and operated in a specific orientation, and therefore they should not be understood as limiting the present disclosure.

In addition, the terms "first", "second", etc. are used for descriptive purposes only and cannot be understood as indicating or implying relative importance. In the description of the present disclosure, it should be noted that, unless otherwise clearly specified or limited, the terms "connect" and "joint" should be understood in a broad sense, for example, it can be a fixed connection, a detachable connection, or an integrated connection, it can be a mechanical connection or an electrical connection, it can be directly connected or indirectly connected through an intermediate medium. For those skilled in the art, the specific meanings of the above terms in the present disclosure can be understood according to the specific circumstances. In the description of the present disclosure, unless otherwise specified, "multiple" means two or more, which will not be described in detail herein.

The present disclosure provides a bionic cuttlefish-typed underwater detection robot, which has a bionic "cuttlefish"-typed structure in shape. It uses ocean energy to excite piezoelectric materials, allows the piezoelectric materials to deform and generate electricity, thereby providing an energy source for the underwater detection robot. The underwater detection robot has the following advantages:

I. The underwater detection robot provided by the present disclosure has a bionic "cuttlefish" shape, which can be well integrated into the marine environment to improve its environmental adaptability. The head of the detection robot adopts a streamlined structure to reduce water flow resistance and improve its speed and maneuverability of underwater movement.

II. The present disclosure adopts a double-layer waterproof design for the main body of the detection robot. The inner layer of the device stores the circuit rectification control system and the data recording chip, etc. If the outer layer is flooded, the inner layer can still play a protective role. Additionally, the fixing device is set to a pin-type connection, which can be disassembled at any time, therefore it is convenient for maintenance personnel to maintain the internal circuit and save maintenance time.

III. The detection robot collects marine energy to provide centralized energy for its own operation and endurance, realizes its underwater autonomous operation, further improves the energy conversion and transportation capacity, achieves unexpected energy saving and emission reduction effects, and adapts to today's green development/economy.

IV. The present disclosure uses piezoelectric ceramic elements of a five-layer cross cantilever beam structure with spoiler components and tail PVDF floating belts to generate electricity. Through the rectification circuit and the energy collection circuit, the stability of energy storage and energy supply is guaranteed. Moreover, the piezoelectric ceramic elements are easier to manufacture than the general single crystals in terms of physical and chemical properties, and the cost is lower, which greatly improves the economy and reliability of the underwater robot. In addition, the PVDF floating belts have strong fatigue resistance and high piezoelectric voltage constant, which is suitable for long-term work in a high-intensity marine environment.

Next, the technical solutions provided by various embodiments of the present disclosure will be described in conjunction with the accompanying drawings.

Embodiment

This embodiment provides a bionic cuttlefish-typed underwater detection robot, as shown in FIGS. 1-4, specifically including: a bionic "cuttlefish"-typed body structure, and a piezoelectric energy capture (energy-harvesting) device, a circuit rectification and storage assembly 9 and a power control assembly 10 arranged on the bionic "cuttlefish"-typed body structure.

The bionic "cuttlefish"-typed body structure includes a head 4 and a main body 7, and the head 4 is connected to the main body 7 by a plugging way. The head 4 is of a double-layer streamlined structure, which smoothly transitions to the main body 7 to reduce water flow resistance.

The piezoelectric energy capture device includes multiple groups of piezoelectric ceramic elements 2 and multiple PVDF floating belts 12 with thin films attached thereon. The multiple groups of piezoelectric ceramic elements 2 are arranged around the main body 7 in a cross cantilever beam axisymmetric structure, and the end of each piezoelectric ceramic element 2 is connected to a spherical spoiler component 1, and the multiple PVDF floating belts 12 with thin films are evenly distributed at the tail end of the main body 7.

The circuit rectification and storage assembly 9 and the power control assembly 10 are both installed inside the main body 7. The circuit rectification and storage assembly 9 is electrically connected to the multiple groups of piezoelectric ceramic elements 2 and the multiple PVDF floating belts 12 with thin films, for converting the electric energy obtained by the piezoelectric energy capture device into stable DC electric energy and storing it; the power control assembly 10 is electrically connected to the circuit rectification and storage assembly 9, for controlling the power of the underwater detection robot through the electric energy provided by the circuit rectification and storage assembly 9.

In this embodiment, four groups of piezoelectric ceramic elements 2 are evenly distributed around the main body 7, and each group of piezoelectric ceramic elements includes five piezoelectric ceramic elements 2 arranged along the axial direction at intervals, there are a total of 20 piezoelectric ceramic elements, and each piezoelectric ceramic element 2 includes a longitudinal piezoelectric ceramic sheet and a flexible protective shell covering the longitudinal piezoelectric ceramic sheet. The size of the longitudinal piezoelectric ceramic sheet is 0.18 m×0.06 m×0.012 m. When the detection robot swims underwater and the ocean flows, the piezoelectric ceramic elements 2 can accept various ocean energies with multiple degrees of freedom to generate electricity through deformation. The spherical spoiler components 1 are installed at their front ends, which can increase the deformation space of the piezoelectric ceramic elements 2 and increase the power generation. In this embodiment, a total of 6 PVDF floating belts are set, with a length of 0.4 m, and thins films are attached to them. When water flows over the surfaces of the floating belts, the thin films vibrate and generate a potential difference.

In addition, the main body 7 is of a double-layer cylindrical structure, which includes an inner layer cylinder and an outer layer cylinder, and it is provided with multiple insertion holes 5; each piezoelectric ceramic element 2 is inserted into the inner-layer fixing port 15 of the main body 7 through the insertion hole 6 for fixing.

The power control assembly includes a motion control chip arranged inside the inner layer cylinder of the main body 7, and a tail propeller/thruster 8 at the tail end of the main body 7. The motion control chip is used to control the speed and direction of the tail propeller 8 to change the movement and steering of the underwater detection robot.

In order to protect the tail propeller 8 of the underwater detection robot from interference from marine debris, the bionic cuttlefish-typed underwater detection robot of this embodiment is also provided with an annular protection frame 3. The annular protection frame 3 includes a first annular frame 21, a second annular frame 14, and a plurality of metal connecting rods 6 fixedly connected between the first annular frame 21 and the second annular frame 14; the tail propeller 8 is installed at the tail end of the main body 7 and is located in the first annular frame 21; the diameter of the first annular frame 21 is smaller than the diameter of the second annular frame 14, and the first annular frame 21 is welded to the end surface of the outer layer cylinder of the main body 7, and the annular protection frame 3 is fixedly connected to the tail end of the main body 7 through the first annular frame 21; 6 PVDF floating belts 12 with thin films are evenly distributed on the second annular frame 14. In this way, the tail propeller 8 can be protected from being entangled by marine debris, and the PVDF floating belts and the tail propeller can be prevented from being entangled with each other.

Herein, the 6 PVDF floating belts 12 with thin films are electrically connected to the circuit rectification and storage assembly 9 through the wires arranged in the metal connecting rods 6. The circuit rectification and storage assembly 9 is arranged in the inner layer cylinder of the main body 7, it includes a rectifier circuit board, an energy collector and a battery; the energy collector is used to collect the electric energy generated by the piezoelectric ceramic elements 2 and the PVDF floating belts 12 with thin films, and convert the collected electric energy into DC electric energy through the rectifier circuit board to charge the battery and store electric energy.

Figure 3:
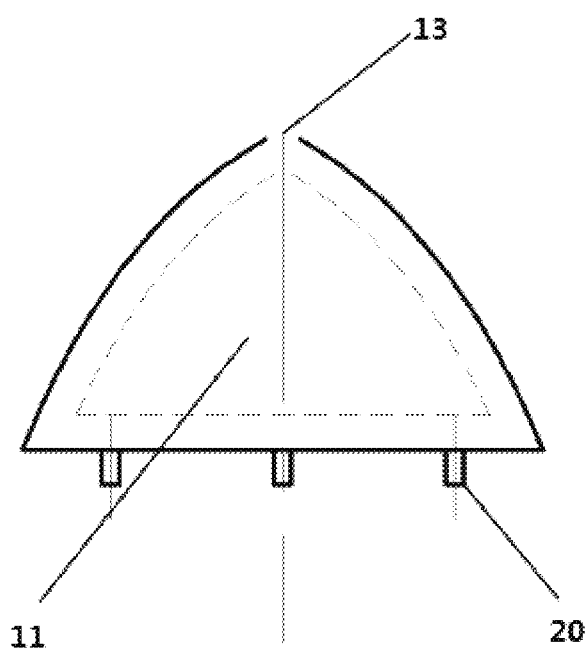
FIG. 3 is a schematic structural view of a head a bionic cuttlefish-typed underwater detection robot provided in this specification.
Figure 4:
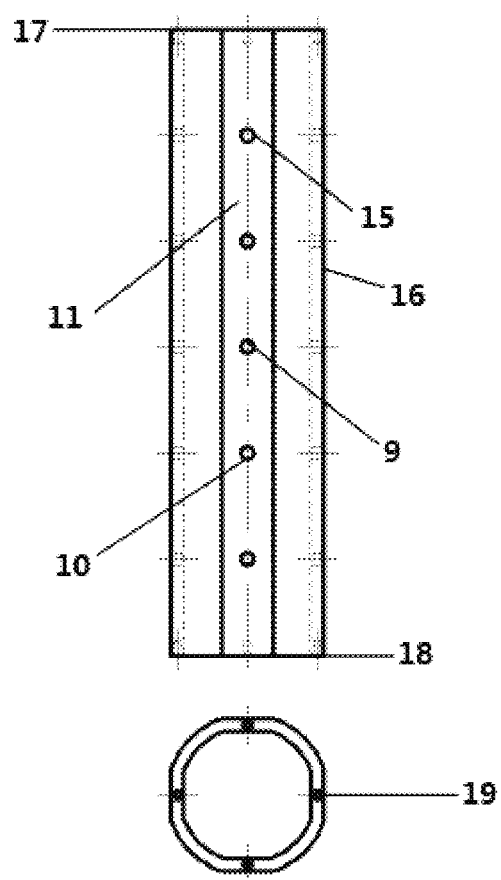
FIG. 4 is a schematic structural view showing an inner layer of a main body of a bionic cuttlefish-typed underwater detection robot provided in this specification.
Figure 5:
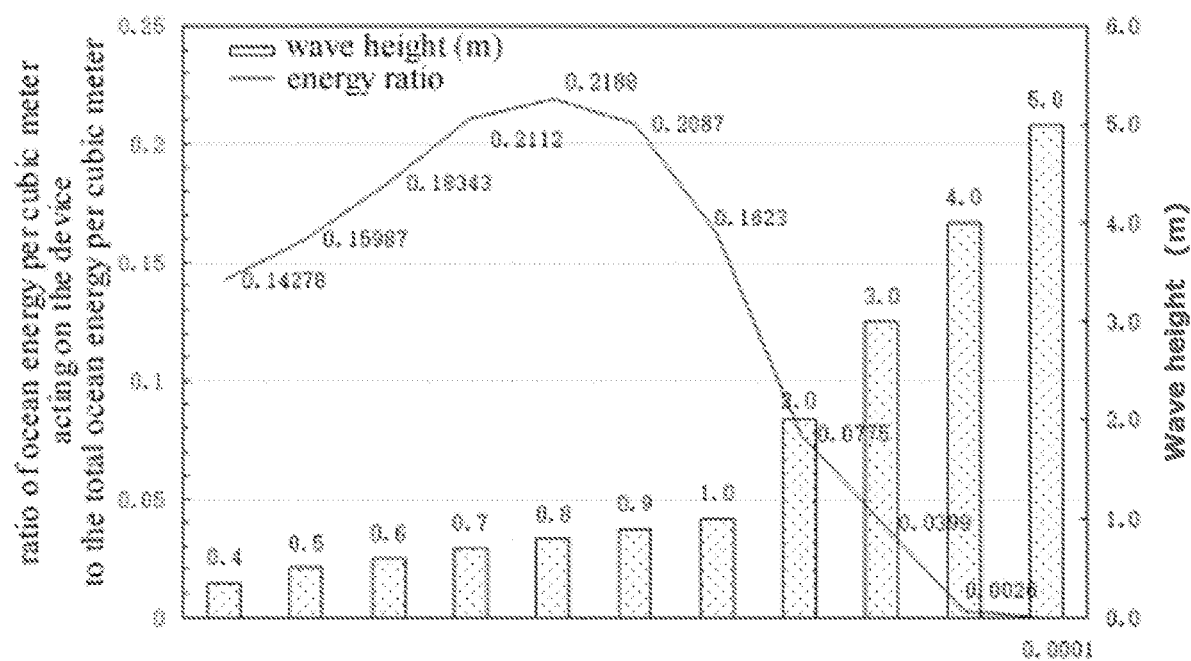
FIG. 5 is a diagram showing the ratio of ocean energy per cubic meter acting on the underwater detection robot of the present disclosure to the total ocean energy per cubic meter, at different wave heights.

In order to detect underwater ocean information, the present embodiment is equipped with a detection assembly 11 in the inner layer of the head 4 of the "cuttlefish" typed body structure, for underwater information detection and collection, it includes: a camera 13, a detection sensor and an information memory; the camera 13 is placed on the top of the head 4, and the detection sensor and the information memory are installed in the inner layer of the head 4, as shown in FIG. 3. The detection sensor is used to collect hydrological information and receive the underwater ocean information captured by the camera 13, and at the same time transmit the collected information to the information memory for storage.

The material of the piezoelectric ceramic sheets/elements selected in this embodiment is TJ-53, and its length is L=0.18 m, width is W=0.06 m, thickness is H=0.012 m, and a total of 20 piezoelectric ceramic elements are set. The power generation of a single piezoelectric ceramic sheet/element per hour is about 0.026 kW·h, and 20 piezoelectric ceramic sheets can provide about 0.52 kW·h of electricity per hour. The average power consumption of a small detection system under normal conditions is about 0.48 kW·h per hour. Therefore, the power generation of 20 piezoelectric ceramic sheets per hour can provide the underwater detection robot with 1.1 hours of movement.

In addition, for ocean basins with different wave heights, the ratio of ocean energy per cubic meter water acting on the underwater detection robot to the total ocean energy per cubic meter water is shown in FIG. 7.

It can be seen intuitively from FIG. 7 that in the ocean basin with a wave height of about 0.8 m, the ocean energy acting on the underwater detection robot per cubic meter is the largest. Under the condition of unchanged energy conversion efficiency, a higher power generation can be obtained. If the wave height is too high or too low, the ocean energy acting on the underwater detection robot per cubic meter water will be greatly reduced, and the power generation will also be reduced. Therefore, the appropriate working area of the underwater detection robot can be selected according to FIG. 7, or it can be improved according to the data to expand its application range.

Based on the characteristics of the bionic cuttlefish-typed underwater detection robot proposed by the present disclosure, it can be used in the following new fields:

Before building new submarine transportation facilities, the underwater detection robot can carry sensors and camera equipment for submarine geological exploration and investigation, and provide necessary data support for the construction of submarine transportation facilities.

Further, the underwater detection robot can be used to conduct detailed evaluation of submarine structures and systems, inspect and maintain underwater transportation facilities, such as bridge piers, underwater tunnels, submarine pipelines, dams, etc., to avoid direct entry of staff into the underwater for operations, reducing safety risks.

Further, the underwater detection robot can conduct a comprehensive inspection of the exterior and bottom of hulls, and can be used to monitor the activities and losses of the shipyard, provide an efficient, safe, and operational ship inspection solution at any time, and reduce operating costs and human risks. Further, in water traffic accidents, the underwater detection robot can be used for search and rescue work, help find missing persons or sunken ships, and provide real-time video and image data when necessary.

Finally, for the development of unknown waters, when it is necessary to detect the new environment, the underwater detection robot can dive into a narrow and small underwater environment that is difficult for humans to enter, perform a 360° all-round inspection, accurately identify and locate potential hazards underwater, and eliminate existing safety hazards and potential hazards.

The technical features of the above embodiments can be combined arbitrarily. In order to make the description concise, all possible combinations of the technical features in the above embodiments are not described. However, as long as there is no contradiction in the combinations of these technical features, they should be considered to be within the scope of the present disclosure.

What is claimed is:

1. A bionic cuttlefish-typed underwater detection robot, comprising a bionic cuttlefish-typed body structure, and a piezoelectric energy capture device, a circuit rectification and storage assembly (9) and a power control assembly (10) arranged on the bionic cuttlefish-typed body structure, wherein the bionic cuttlefish-typed body structure comprises a head (4) and a main body (7);

wherein the piezoelectric energy capture device comprises multiple groups of piezoelectric ceramic elements (2) and multiple polyvinylidene difluoride (PVDF) floating belts (12) with films attached thereon, and the multiple groups of piezoelectric ceramic elements (2) are arranged around the main body (7) in a cross cantilever beam axisymmetric structure, and an end of each piezoelectric ceramic element (2) is connected to a spherical spoiler component (1), the multiple PVDF floating belts (12) are evenly distributed at a tail end of the main body (7);

wherein the circuit rectification and storage assembly (9) and the power control assembly (10) are both installed inside the main body (7), the circuit rectification and storage assembly (9) is electrically connected to the multiple groups of piezoelectric ceramic elements (2) and the multiple PVDF floating belts (12), for converting electric energy obtained by the piezoelectric energy capture device into stable direct current electric energy and storing it; the power control assembly (10) is electrically connected to the circuit rectification and storage assembly (9), for implementing power control of the underwater detection robot through the electric energy provided by the circuit rectification and storage assembly (9).

2. The bionic cuttlefish-typed underwater detection robot as claimed in claim 1, wherein 4-5 groups of piezoelectric ceramic elements (2) are evenly distributed around the main body (7), and each group of piezoelectric ceramic elements (2) comprises 5-6 piezoelectric ceramic elements (2) arranged in an axial direction at intervals.

3. The bionic cuttlefish-typed underwater detection robot as claimed in claim 1, wherein each piezoelectric ceramic element (2) comprises a longitudinal piezoelectric ceramic sheet and a flexible protective shell covering the longitudinal piezoelectric ceramic sheet;

wherein the longitudinal piezoelectric ceramic sheet has a size of 0.18 m×0.06 m×0.012 m.

4. The bionic cuttlefish-typed underwater detection robot as claimed in claim 1, wherein the main body (7) is of a double-layer cylindrical structure, comprising an inner layer cylinder and an outer layer cylinder, and the outer layer cylinder is provided with a plurality of insertion holes (5), and each of the piezoelectric ceramic elements (2) is inserted through one insertion hole (5) and fixedly connected to an outer wall of the inner layer cylinder.

5. The bionic cuttlefish-typed underwater detection robot as claimed in claim 4, wherein the power control assembly (10) comprises a motion control chip arranged inside the inner layer cylinder of the main body (7) and a tail propeller (8) at a tail end of the main body (7), and the motion control chip is configured to control speed and direction of the tail propeller (8) to change movement and steering of the underwater detection robot.

6. The bionic cuttlefish-typed underwater detection robot as claimed in claim 5, further comprising an annular protection frame (3), wherein the annular protection frame (3) comprises a first annular frame (21), a second annular frame (14) and a plurality of metal connecting rods (6) fixedly connected between the first annular frame (21) and the second annular frame (14);

wherein the tail propeller (8) is installed at the tail end of the main body (7) and located inside the first annular frame (21);

wherein the first annular frame (21) has a diameter less than that of the second annular frame (14), and the first annular frame (21) is fixedly connected to an end surface of the outer layer cylinder of the main body (7), and the annular protection frame (3) is fixedly connected to the tail end of the main body (7) through the first annular frame (21);

wherein the multiple PVDF floating belts (12) are evenly distributed on the second annular frame (14).

7. The bionic cuttlefish-typed underwater detection robot as claimed in claim 6, wherein each of the metal connecting rods (6) is of a hollow structure, and the PVDF flexible floating belts (12) are electrically connected to the circuit rectification and storage assembly (9) through wires arranged in the metal connecting rods (6).

8. The bionic cuttlefish-typed underwater detection robot as claimed in claim 1, wherein a total of 6-8 PVDF flexible floating belts (12) are provided.

9. The bionic cuttlefish-typed underwater detection robot as claimed in claim 1, wherein the PVDF floating belts (12) have a length of 0.4 m-0.5 m.

10. The bionic cuttlefish-typed underwater detection robot as claimed in claim 4, wherein the circuit rectification and storage assembly (9) is arranged in the inner layer cylinder of the main body (7), and the circuit rectification and storage assembly comprises a rectifier circuit board, an energy collector and a battery; the energy collector is configured to collect electric energy generated by the piezoelectric ceramic elements (2) and the PVDF floating belts (12), and convert the collected electric energy into direct current electric energy through the rectifier circuit board to charge the battery and store electric energy.

* * * * *